(12) United States Patent  
Christensen et al.

(10) Patent No.: US 9,224,134 B2  
(45) Date of Patent: Dec. 29, 2015

(54) ARRANGING A CONVERSATION AMONG A PLURALITY OF PARTICIPANTS

(71) Applicant: International Business Machines Corporation, Armonk, NY (US)

(72) Inventors: James E. Christensen, Cortlandt Manor, NY (US); Andrew L. Schirmer, Andover, MA (US); Tracee L. Wolf, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 13/723,777

(22) Filed: Dec. 21, 2012

(65) Prior Publication Data

US 2014/0181696 A1   Jun. 26, 2014

(51) Int. Cl.
| | |
|---|---|
| *G06Q 10/10* | (2012.01) |
| *G06F 3/01* | (2006.01) |
| *H04M 3/56* | (2006.01) |
| *H04L 12/18* | (2006.01) |
| *H04M 3/42* | (2006.01) |

(52) U.S. Cl.
CPC ............... *G06Q 10/107* (2013.01); *G06F 3/01* (2013.01); *H04L 12/1818* (2013.01); *H04M 3/42382* (2013.01); *H04M 3/56* (2013.01); *G06Q 10/10* (2013.01); *H04M 2203/652* (2013.01)

(58) Field of Classification Search
CPC .. G06F 3/04812; G06Q 10/10; G06Q 10/107; H04N 7/15; H04N 21/4438; H04L 12/1813; H04L 12/581; H04L 29/06; H04L 12/58

USPC .......................................... 715/753, 756, 758
See application file for complete search history.

(56) References Cited

U.S. PATENT DOCUMENTS

| | | | |
|---|---|---|---|
| 7,693,736 B1 | 4/2010 | Chu et al. | |
| 8,429,292 B2 | 4/2013 | Adams et al. | |
| 2004/0161090 A1* | 8/2004 | Digate et al. ............. | 379/202.01 |
| 2006/0271419 A1 | 11/2006 | O'Sullivan | |
| 2007/0226035 A1* | 9/2007 | Doss et al. ........................ | 705/9 |
| 2008/0040189 A1* | 2/2008 | Tong et al. ........................ | 705/9 |
| 2008/0313713 A1 | 12/2008 | Cutler | |
| 2008/0320025 A1 | 12/2008 | Ozzie et al. | |
| 2009/0055236 A1 | 2/2009 | O'Sullivan et al. | |

(Continued)

OTHER PUBLICATIONS

U.S. Appl. No. 13/724,104, Non-Final Office Action 1, Apr. 22, 2014, 23 pg.

(Continued)

*Primary Examiner* — Amy Ng
*Assistant Examiner* — Roland Casillas
(74) *Attorney, Agent, or Firm* — Cuenot, Forsythe & Kim, LLC (57) ABSTRACT

Arrangements disclosed herein relate to arranging a conversation among a plurality of participants. At least one user input related to a conversation intended by at least one user to take place can be identified. The desired conversation can include the plurality of participants. The conversation need not pre-scheduled. Contextual information of the plurality of participants can be monitored in real time to determine whether it is presently appropriate for the conversation to take place. When the contextual information of the plurality of participants indicates that it is presently appropriate for the conversation to take place, initiation of the conversation can be attempted.

20 Claims, 3 Drawing Sheets

200

Identify at least one user input related to a conversation intended by at least one user to take place, the desired conversation including the plurality of participants, wherein the conversation is not pre-scheduled
205

Monitor, in real time using a processor, contextual information of the plurality of participants to determine whether it is presently appropriate for the conversation to take place
210

When the contextual information of the plurality of participants indicates that it is presently appropriate for the conversation to take place, using the processor, attempt to initiate the conversation
215

(56) References Cited

U.S. PATENT DOCUMENTS

| | | |
|---|---|---|
| 2009/0217176 A1 | 8/2009 | Coulomb et al. |
| 2011/0184772 A1 | 7/2011 | Norton et al. |
| 2011/0320237 A1 | 12/2011 | Beaman et al. |
| 2012/0022909 A1 | 1/2012 | Ayatollahi et al. |
| 2013/0217364 A1 | 8/2013 | Varoglu et al. |
| 2013/0246116 A1 | 9/2013 | Bank et al. |
| 2014/0181092 A1 | 6/2014 | Barlow et al. |
| 2014/0181094 A1 | 6/2014 | Barlow et al. |

OTHER PUBLICATIONS

Walling, S., "Top 10 Apps for Scheduling a Meeting Online," [online] ReadWrite Enterprise, © 2012 SAY Media, Inc., Sep. 4, 2009 [retrieved Dec. 19, 2012] retrieved from the Internet: <http://readwrite.com/2009/09/04/the-top-ten-apps-for-scheduling-a-meeting-online>, 6 pgs.

"Group Scheduling Software—Meeting Schedule Software," [online] Asure Software, © 2012 PeopleCube [retrieved Dec. 19, 2012] retrieved from the Internet: <http://www.asuresoftware.com/PeopleCube/products-other-meeting-maker-features.htm>, 3 pgs.

"Wiki for Intelligent Semantic Event Reporting (WISER)," [online] United States Government, Small Business Innovation Research / Small Business Technology Transfer "SBIR/STTR" [ retrieved Dec. 19, 2012] retrieved from the Internet: <http://www.sbir.gov/sbirsearch/detail/7517>, 2 pgs.

Whitney, L., "Apple invention would let you check the status of another iPhone user," [online] CNET NEWS, Aug. 22, 2013 [retrieved Sep. 8, 2013] retrieved from the Internet: <http://news.cnet.com/8301-13579_3-57599685-37/apple-invention-would-let-you-check-the-status-of-another-iphone-user/>, 3 pg.

U.S. Appl. No. 13/724,104, Non-Final Office Action 2, Aug. 6, 2014, 19 pg.

U.S. Appl. No. 14/022,320, Non-Final Office Action, Nov. 24, 2014, 30 pg.

U.S. Appl. No. 13/724,104, Final Office Action, Nov. 18, 2014, 22 pg.

\* cited by examiner

```
Identify at least one user input related to a conversation intended
by at least one user to take place, the desired conversation
including the plurality of participants, wherein the conversation is
not pre-scheduled
205
```

```
Monitor, in real time using a processor, contextual information of
the plurality of participants to determine whether it is presently
appropriate for the conversation to take place
210
```

```
When the contextual information of the plurality of participants
indicates that it is presently appropriate for the conversation to
take place, using the processor, attempt to initiate the conversation
215
```

ARRANGING A CONVERSATION AMONG A PLURALITY OF PARTICIPANTS

BACKGROUND

Arrangements described herein relate to arranging a conversation among a plurality of participants.

In most facets of life, the need arises to discuss a topic with one or more persons or organizations at some point in the future. Scheduling a meeting requires interactions with other people in advance, often involves rescheduling. There are various techniques and tools to assist an individual in planning future activities and to remember the topics for discussion. Examples of such techniques and tools include making mental notes, writing "to do" lists, making calendar entries, sticky notes, asking someone or something (e.g. a computer) to remind us, bulletin boards, etc. For instance, when using a calendar entry, a user may initially guess at an appropriate date/time.

BRIEF SUMMARY

One or more embodiments disclosed within this specification relate to arranging a conversation among a plurality of participants.

A method can include identifying at least one user input related to a conversation intended by at least one user to take place, the desired conversation including the plurality of participants, wherein the conversation is not pre-scheduled. The method also can include monitoring, in real time using a processor, contextual information of the plurality of participants to determine whether it is presently appropriate for the conversation to take place. The method further can include, when the contextual information of the plurality of participants indicates that it is presently appropriate for the conversation to take place, using the processor, attempting to initiate the conversation.

A system can include a processor programmed to initiate executable operations. The executable operations can include identifying at least one user input related to a conversation intended by at least one user to take place, the desired conversation including the plurality of participants, wherein the conversation is not pre-scheduled. The executable operations also can include monitoring, in real time, contextual information of the plurality of participants to determine whether it is presently appropriate for the conversation to take place. The executable operations further can include, when the contextual information of the plurality of participants indicates that it is presently appropriate for the conversation to take place, attempting to initiate the conversation.

A computer program product can include a computer readable storage medium having program code stored thereon, the program code executable by a processor to perform a method. The method can include identifying, by the processor, at least one user input related to a conversation intended by at least one user to take place, the desired conversation including the plurality of participants, wherein the conversation is not pre-scheduled. The method also can include monitoring, by the processor in real time, contextual information of the plurality of participants to determine whether it is presently appropriate for the conversation to take place. The method further can include, when the contextual information of the plurality of participants indicates that it is presently appropriate for the conversation to take place, by the processor, attempting to initiate the conversation.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to arranging a conversation among a plurality of participants. A user who desires for a conversation to take place among one or more participants (i.e., people) can enter a user input into a system indicating such intent. The system can monitor, in real time using a processor, contextual information of each of the proposed participants, including the user requesting the conversation if such user is a desired participant for the conversation. As used herein, the term "real time" means a level of processing responsiveness that a user or system senses as sufficiently immediate for a particular process or determination to be made, or that enables the processor to keep up with some external process. The contextual information can include status information, pending commitments, or any other information that may be processed to identify when a respective participant is currently available to participate in the conversation. The contextual information can include information gathered from each participant's respective client device and/or information gathered from external information sources, such as social networking websites, electronic communication servers, telecommunication systems, and the like. When the contextual information for the respective participants indicates that it is presently appropriate for the conversation to take place (e.g., each of the participants is currently available), the system can automatically attempt to initiate the conversation.

Figure 1:
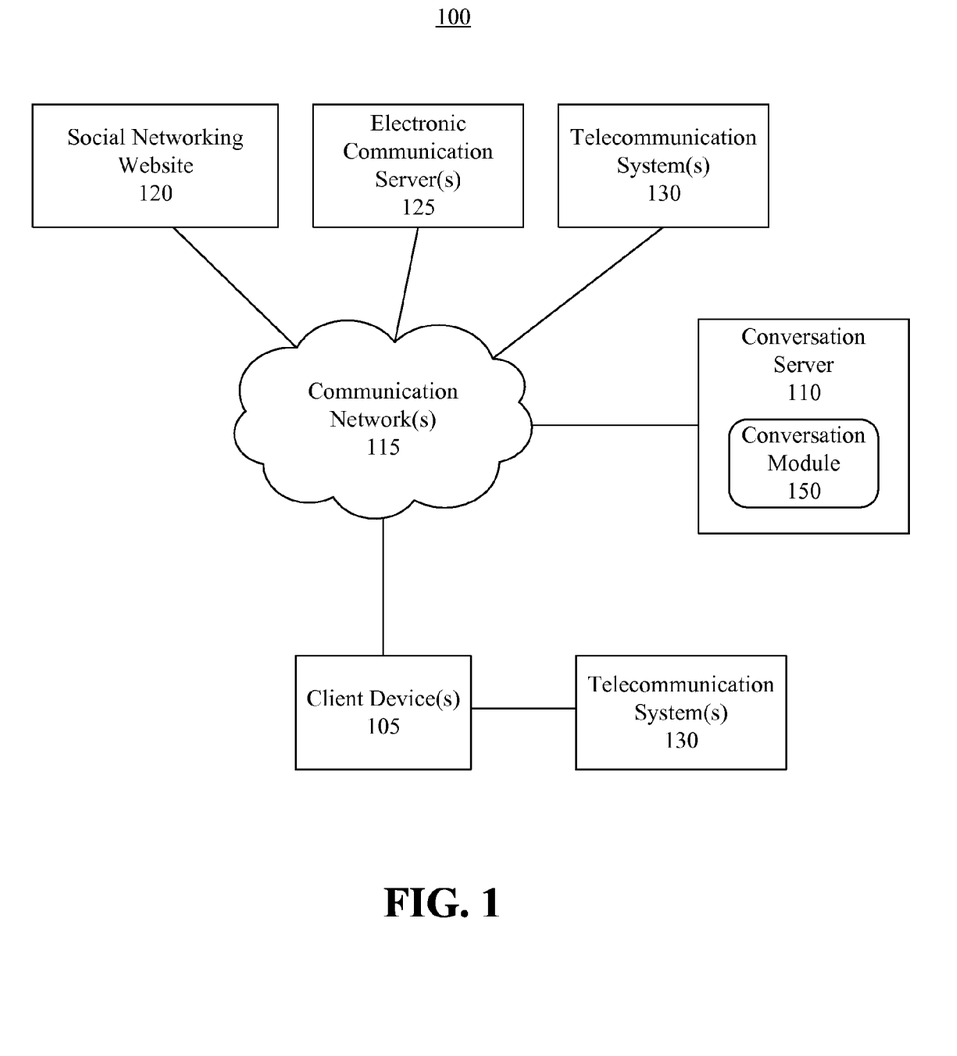
FIG. 1 is a block diagram illustrating a system for arranging a conversation among a plurality of participants in accordance with one embodiment disclosed within this specification.

FIG. 1 depicts a block diagram illustrating a system 100 for arranging a conversation among a plurality of participants in accordance with one embodiment disclosed within this specification. The system 100 can include one or more client devices 105 used by one or more users (i.e., persons) who are requested participants for the conversation, or who desire to have the conversation take place, but not necessarily participate in the conversation. A client device 105 can be any suitable device including, for example, a computer (e.g., a workstation, a desktop computer, a laptop computer, a mobile computer, a tablet computer, etc.), a telephone (e.g., a wired telephone, a smart phone, a cellular telephone, an in-car hands free phone, etc.) a personal digital assistant ("PDA"), a portable communication device, etc. In some instances, the one or more client devices 105 can be configured to communicate via a wireless and/or wired communication medium.

The system 100 can include a conversation server 110, which can be communicatively linked to the client device(s) 105 via one or more communication networks 115. When there are a plurality of client devices 105, the client devices also may be communicatively linked to one another via the one or more communication networks 115. As used herein, the term "communicatively linked" can include direct or indirect connections through a communication channel or pathway or another component or system. A "communication network" means one or more components designed to transmit and/or receive information from one source to another. The communication network 115 can include wired communication links and/or wireless communication links. The communication network 115 can comprise the Internet, a wide area network (WAN), wireless wide area network (WWAN), a local area network (LAN), wireless local area network (WLAN), a personal area network (PAN), a wireless communication network and/or the like. The communication network 115 can include any combination of the above networks and/or other types of networks. The network can include one or more routers, switches, access points, wireless access points, and/or the like.

The system 100 can include one or more social networking websites 120. "Social networking website" as used herein refers to web-based technologies used to turn communication into interactive dialogue between organizations, communities, and individuals. Examples of social networking websites include, for example, collaborative projects (e.g., Wikipedia®), blogs and micro blogs (e.g., Twitter®), content communities (e.g., YouTube), social networking sites (e.g., Facebook®, LinkedIn®, Google+™, MySpace®, etc.) and virtual gaming worlds. The social networking website 120 can support messaging (e.g., an electronic mail system, an instant messaging (IM) system, a Short Messaging System (SMS), or the like). The social media website(s) 120 can be communicatively linked to the one or more client devices 105 and/or the conversation server 110. The system 100 also can include any other desired websites (not shown), for example news information sites, etc.

The system 100 can include one or more electronic communication servers 125. The electronic communication server 125 can be implemented as, for example, an electronic mail system, a calendar system (included in or separate from the electronic mail system), an instant messaging (IM) system, a text messaging system, a video conference system (including, but not limited to, a host for shared screen sessions), or the like. In this regard, the electronic communication server 125 can be implemented as an electronic mail server, an instant messaging server, a text messaging server, a video chat server or other communication hub or server capable of routing electronic communications within or as part of the communication network 115. The electronic communication server 125 can include suitable operational software for performing the various functions described herein. The electronic communication server(s) 125 can be communicatively linked to the client device(s) 105 and/or the conversation server 110.

The system 100 can include one or more telecommunication systems 130. The telecommunication systems 130 can be implemented as, for example, a telephone system (e.g. Voice over Internet Protocol (VoIP) system, a business telephone system, a proviate branch exchange (PBX), etc.), a voicemail system, a facsimile system, and the like. In this regard, the one or more telecommunication systems 130 can be implemented as a telephone server, a voicemail server, a facsimile server, or other communication hub or server capable of routing telecommunications within or as part of the communication network 115. The telecommunication system(s) 130 can include suitable operational software for performing the various functions described herein. The telecommunication system(s) 130 can be communicatively linked to the client device(s) 105 and/or the conversation server 110. The telecommunication system 130 may support messaging.

In one arrangement, a telecommunication system 130 can be directly linked to the client device(s) 105. In another arrangement, a telecommunication system 130 can be communicatively linked to the client device(s) 105 via the communication network(s) 115. Such arrangements are not mutually exclusive, however. For example, the telecommunication system 130 can be directly linked to one or more of the client device 105 via direct and linked to other ones of the client device 105 via the communication network(s) 115.

The system 100 can include a conversation module 150. In one arrangement, the conversation module 150 can be stored and/or executed on the one or more client devices 105. In another arrangement, the conversation module 150 can be stored and/or executed on a conversation server 110. As a further implementation, which can be as an alternative or in addition to the above, the conversation module 150 can be stored and/or executed on one or more social networking websites 120, one or more electronic communication servers 125, one or more telecommunication systems 130 and/or one or more client devices 105.

The conversation module 150 can receive and/or store one or more user inputs received from one or more users related to a desire to have a conversation take place. For instance, the user input(s) can specify a plurality of participants whom the user(s) identify as desired participants (hereinafter "participants") in the conversation. The participants may include the user, or one or more of the users, requesting that the conversation take place, but this need not be the case. A user requesting that the conversation take place, as used herein, is an "originating user." The term "originating user" is defined as a user inputting a user input or a user who is using the system to acquire an input to request that a conversation take place. Hereinafter, the term "originating user" will be used to refer to one or more originating users. Thus, the term "originating user" may be used to refer to a single originating user or a plurality of originating users.

The user input(s) also can indicate those participants that are mandatory for the conversation, and those participants the user would like to, or are allowed to, participate in the conversation, but are not mandatory. The conversation module 150 can receive the user input(s) in any suitable manner. For instance, the user input(s) can be received from the user via one or more of the client devices 105. Accordingly, the client device 105 can include an input system for receiving user inputs. Any suitable input system can be used, including, for example, a keypad, display, touch screen, button, joystick, mouse, trackball, microphone or combinations thereof.

Alternatively or in addition, the user input(s) can be received from an external information source. As used herein, the term "external information source" means any source of information external to the client devices 105 and the conversation server 110 (if provided). For instance, an external information source can be the social networking website(s) 120, a news information source or website (not shown), the electronic communication server(s) 125, the telecommunication system(s) 130, and/or any combination thereof. The conversation module 150 can be configured to acquire, automatically or upon user command, one or more inputs relating to the intention for a conversation to take place (e.g., a present conversation or future conversation) from an external information source. The conversation module 150 can be configured by the user or some other entity, or by a system default as to which external information sources to search for one or more first inputs relating to the intention to have a conversation.

The conversation module 150 may acquire other attributes from the external information source(s). Such attributes may include, but are not limited to, attributes acquired from the social networking website(s) 120 related to social information shared by one or more originating users and/or participants on such websites, attributes acquired from one or more news websites or other news sources related to real world events or news articles, and the like.

Responsive to receiving the user input(s) from the originating user, the conversation module 150 can be configured to receive one or more attributes related to the intended conversation and associated with the user input. As used herein, the term "attribute" is defined as any property, characteristic, requirement or information associated with an intended conversation that provides context for the conversation. As will be explained, such attributes can facilitate the managing, organizing and/or prioritizing of intended conversations.

One example of an attribute is the identity of one or more participants of the intended conversation. The one or more participants can include persons, entities, organizations, and/or other identity. Another attribute may be the importance, relevance and/or relationship (e.g., personal, work, colleague, vendor, boss, subordinate, certain function units within an organization, etc.) of a participant to the originating user or to some other reference point.

Another example of an attribute is the subject of the conversation. The subject may be a topic, a question, a keyword, a project name, an issue, etc. Another attribute can be the importance of the subject, to the originating user or some other reference point.

A further example of an attribute is the expected duration of the conversation. Yet another example of an attribute is the time sensitivity of the conversation. For instance, the time sensitivity can be a deadline to have the conversation, the urgency of the conversation, a window of opportunity in which to have the conversation, etc. A further attribute can be one or more temporal conditions. For instance, during certain times (e.g. hours, days, weeks, months), certain attributes may have greater importance than at other times.

Still another example of an attribute is one or more channel constraints of the intended future conversation. For instance, the originating user can indicate that the manner in which intended future conversation can be or must be conducted (e.g. face to face or in a telephone call, instant message or email). Alternatively, the user can indicate that certain equipment is required during the conversation. As an example, the originating user may indicate that a two-way video feed, projector, etc. is required. Another attribute can be the current channel availability for originating user and other participant(s).

The attribute can identify the modality of the channels of conversation. For instance, the originating user can indicate that the intended future conversation can be fully synchronous, semi-synchronous, or even asynchronous. An additional attribute can be availability status of the identified participants. The availability status can be the availability of a participant and/or the originating user as indicated by any suitable source (e.g. social networking websites, etc.) of listed participants.

Another attribute may be the ability of the originating user to conduct a planned conversation in his/her current context. Examples include: the communication capabilities of the user's current client device, the user's projected current free time versus the expected duration of the planned conversation, and the current and/or near-term availability of the participant(s), which may take into account channel restraints.

Another attribute may be a current location of a particular participant. For example, for each participant, a current location attribute can be maintained, and accessed by the conversation module. The current location can be, for example, based on which client device 105 a particular participant currently is logged onto, and the location of that device. The location can be determined based on a uniform resource identifier (URI), such as a uniform resource locator (URL), assigned to the client device 105, global or local positioning coordinates of the client device 105, or the like. In this regard, one or more of the client devices 105 can include a global positioning system receiver (not shown) that generates current location information, and the client device(s) can share the current location information with the conversation module 150, or any of the external information sources, for example those described herein. In the case that the current location information is shared with one or more external information sources, the conversation module 150 can access corresponding attributes from such external information sources.

One or more other attributes also can be input by the originating user with regard to the user's request that the conversation take place. The user may input the one or more attributes of his or her own initiative. Alternatively or in addition, the client device 105 or an external information source can prompt the originating user to input one or more attributes. In one embodiment, the system can be configured to automatically prompt the originating user to input one or more attributes of an intended conversation as each input is received.

Optionally, one or more of the participants to the conversation, such as those indicated by the user, can be prompted by the conversation module 150 to input one or more attributes for the conversation, such an available time or times, a preferred mode of communication, an indication of one or more other participants who should participate in the conversation, etc. The participants can provide the attributes directly to the conversation module 150 via respective client devices 105, or via external information sources from which the conversation module 150 can acquire such attributes. In illustration, in response to the originating user requesting the conversation, a message can be sent to each of the participants indicating such request, and prompting the participants enter user inputs indicating desired and/or necessary parameters for the conversation.

User/participant inputs and attributes ascertained by the conversation module 150, collectively, form contextual information which can be processed by the conversation module 150 to determine when the conversation should take place. As used herein, the term "contextual information" means information related to an originating user and/or one or more participants that is ascertained from one or more user/participant inputs and/or one or more attributes. In illustration, user inputs by a particular user/participant and/or attributes associated with that particular user/participant can be ascertained to form contextual information for that user/participant. User inputs by a group of users/participants and/or attributes associated with that particular group of users/participants can be ascertained to form contextual information for that group of users/participants. In other words, the contextual information can be very dynamic, and can continually update, in real time, as various user/participant inputs and/or attributes are detected by the conversation module 150.

In one aspect of the present arrangements, at least one attribute can be acquired, automatically or by user command, by the conversation module 150 from one or more external information sources. In one implementation, the external information sources used to acquire one or more attributes can be the same as the external information sources used to acquire the user input(s). However, in other implementations, the external information sources used to acquire one or more attributes can be different from the external information sources used to acquire the first inputs in one or more respects. The conversation module 150 can be configured by the user or some other entity as to which external sources of information to search for one or more attributes for an intended conversation. The conversation module 150 can be configured by the user or some other entity, or by system default as to which external information sources to acquire attributes relating to an intended conversation. For instance, a user or participant can configure the conversation module 150 to acquire one or more attributes (e.g. relationship or priority information) from his or her social networking account or site, his or her calendar, etc.

The system 100 can be configured to operate entirely manually, that is, the user provides all of the inputs to the conversation module 150, such as by using one or more client devices 105. Alternatively, the system 100 can be configured to operate automatically, that is, the user/participant inputs and attributes can be acquired by the conversation module 150 without the user/participant having to input such information. Of course, the system 100 can be configured to include combinations of both implementations.

The various inputs and attributes can be stored by the conversation server 110, and accessed by the conversation module 150, in any suitable manner. For example, the inputs/parameters can be stored to a data table, database, or other suitable data structure. In illustration, the inputs/parameters can be stored to a context database. The context database can include numerous fields comprising variables that represent user/participant intent, participant availability, conditions imposed on the conversation, etc.

Notably, the originating user need not schedule, or pre-schedule, the conversation. Instead, the originating user need only indicate a request that the conversation happen. The conversation module 150 can, based on inputs and/or attributes described herein, monitor, in real time using a processor, the contextual information to determine whether it is presently appropriate for the conversation to take place. It may be presently appropriate when all of the participants currently are available to participate in the conversation, or when all participants indicated as being mandatory participants are available to participate in the conversation.

When the contextual information indicates that it is presently appropriate for the conversation to take place, the conversation module 150 can automatically attempt to initiate the conversation. For example, the conversation module 150 can automatically place a telephone call to each of the plurality of participants, automatically establish a text messaging session (e.g., instant messaging (IM) session, chat session or e-mail session) that includes each of the plurality of participants, or automatically establish a video conference session that includes each of the plurality of participants.

In another arrangement, the conversation module 150 can send, to each of the participants, a message inquiring whether the respective participant is presently available to participate in the conversation. Responsive to each of the participants, or at least mandatory participants, indicating that they are presently available, the conversation module 150 can automatically place a telephone call to each of the plurality of available participants, automatically establish a text messaging session that includes each of the plurality of available participants, or automatically establish a video conference session that includes each of the plurality of available participants.

In another example, the conversation module 150 can send a message to at least a first of the plurality of participants to indicate that at least the mandatory participant(s) is/are presently is available to participate in the conversation. In one aspect, such message can be sent responsive to each participant (or mandatory participant) indicating that they are presently available. In another aspect, such message can be sent in lieu of sending the messages inquiring whether the respective participants are presently available to participate in the conversation. The present message can prompt the first participant to contact at least a second of the plurality of participants via a telephone call, a text message or a video conference call. In another arrangement, the conversation module 150 can send a message to each of the participants inviting the participants to join the conversation. For example, the message can indicate a telephone number to call (e.g., a first participant's telephone number or a telephone conference bridge), and any pass code or extension that may be used to access the first participant or telephone conference call. The message also can request each of the participants to log into a particular text messaging system, log into a particular video conference server, or the like, along with any information that may be used to access such system/server.

In another arrangement, the conversation module 150 can send a message to at least a first of the plurality of participants indicating to the first participant that at least a second of the plurality of participants presently is located proximate to the first participant, for example based in a URL or positioning coordinates of a client device 105 currently being used by the second participant. Thus, the message can prompt the first participant to initiate an in person (e.g., face-to-face) conference with at least a second participant. In another aspect, such message can be sent to each of the participants. In aspect, though, two or more participants may converse in person, while one or more other participants converse via text messaging, a telephone call or a video conference.

A message sent to the first participant (or to the plurality of participants) can be, for example, a text message (e.g., IM, chat message or e-mail message), an audible message, an alert or the like. In one arrangement, the message can initiate the client device 105 or an external information source to present the message or a corresponding indicator to the first participant. For instance, the client device 105 (or external information source) can present a pop-up message, a pop-window, an audible message, a visual alert, an audible alert, etc. In one example, the first participant's client device or an external information source can present an identifier for each of the requested participants for the conversation, and a status indicator that indicates whether the respective participants are currently available for the conversation, for instance an image, icon, a colored indicator (e.g., red or green), and so on. Such a message also can be sent to one or more other participants, and such participants also can be presented a corresponding message or indicator(s).

When receiving the attempt to initiate the conversation, each of the participants either can join the conversation, or provide a response to the conversation module 150, such as a parameter, indicating a condition necessary for the first participant to participate in the conversation. In such case, for example if the participant providing the response is a mandatory participant, the conversation module 150 can delay the conversation. In this regard, the conversation module 150 can monitor, in real time using a processor, the specified condition to determine whether the condition is satisfied. When the condition is satisfied, the conversation module 150 again can attempt to initiate the conversation, for example as previously described. In illustration, the condition can indicate one or more required parameters, and the conversation module 150 can monitor user/participant inputs and/or attributes to determine when such parameter(s) are present.

In one example, the condition necessary can include a requested time delay. For example, via a respective client device 105 or external information source, a participant can respond "I'll be ready in ten minutes," or select a button, icon or menu item indicating the participant's desire to delay the conversation a certain amount of time. The conversation module 150 can monitor one or more corresponding parameters, and initiate the conversation when such parameters indicate that the condition has been satisfied, so long as the other participants required to be part of the conversation also are currently available at that time.

In another example, the condition necessary can include an indication of at least one other participant requested to participate in the conversation. For example, a particular participant may indicate that he/she would like another participant to be included in the conversation. Such other participant may be someone who was not indicated as being mandatory to the conversation, or someone who was not originally indicated as being a participant in the conversation. In response, the conversation module 150 can identify the other participant/person as being a mandatory participant to the conversation, and initiate the conversation when at least all mandatory participants are currently available for the conversation.

In yet another example, the condition necessary can include an indication of a mode of communication via which the participant chooses to participate in the conversation, which may or may not be different than a mode of communication initially selected by the originating user who scheduled the conversation. Accordingly, the conversation module 150 can allow the participant to participate via the indicated mode of communication, while other participants use another mode of communication, change a parameter of the conversation to take place over the indicated mode of communication, or send a message to the originating user indicating the requested mode of conversation. In the latter case, the originating user can input one or more user inputs to allow or decline the mode of communication.

Further, when receiving the attempt to initiate the conversation, one or more of the proposed participants may choose to opt in the conversation or opt out of the conversation. If a participant chooses to opt out of the conversation, the participant can be removed from a participant list of the conversation and/or the originating user can be notified that the proposed participant has opted out, for example via a message sent to the user by the conversation module 150. In one aspect, if the participant opting out is a mandatory participant, the originating user can approve or decline removing the participant from the participant list.

In another aspect, when determining whether it is presently appropriate to initiate the conversation, the conversation module 150 can determine not only whether all mandatory participants presently are available to participate in the conversation, but also whether all such participants have adequate time available to participate in the conversation. For example, the conversation module 150 can process the contextual information to make such determination. For instance, the contextual information can be processed to identify any other commitments which may arise before the conversation is complete. As noted, when the user initially requests the conversation, the user can provide one or more parameters indicating an expected length of the conversation. Since the contextual information is monitored in real time, any last minute changes to participant schedules and/or commitments can be detected and taken into consideration when the conversation module 150 determines whether it is presently appropriate for the conversation to take place.

Moreover, the conversation module 150 can process various parameters associated with one or more particular participants, for example using a suitable algorithm, to anticipate the participants' personal habits, practices, etc. The results of such algorithm can be processed by the conversation module 150 to further determine whether it is presently appropriate for the conversation to take place. For example, if a participant usually is away from his/her desk at a certain time of day, the conversation module 150 can, during that time of day, determine that it is not presently appropriate for the conversation to take place.

Further, if the parameters associated with the participant indicate that the participant is, or typically is, available via a particular mode of communication (e.g., via mobile communication), the conversation module 150 can choose that mode of communication for that participant to participate in the conversation. For example, one or more participants can participate in a video conference via respective computers, tablet devices and/or smart phones, while one or more participants can participate in the video conference via audio only, for example using a device which may or may not include video conferencing capability, or for which video conferencing is not presently appropriate (e.g., if the person is driving).

In a further non-limiting arrangement, the conversation module 150 can, based on one or more user input(s) and/or identified attributes, identify a future time that the conversation may be able to take place, and hold that time, for example by sending respective messages to participants indicating such future time, making respective entries into the participants' calendars, sending respective requests to make the calendar entries, etc. Nonetheless, as the conversation module 150 continues to monitor user inputs/attributes in real time, the conversation module 150 can make changes to the future time by sending additional messages, updates, etc. In this regard, participants can respond to such messages, calendar entries, etc., by providing additional parameters indicating whether the selected future time is suitable, whether additional participants need to participate in the conversation, requested times for the conversation, requested modes of communication for the conversation, etc., and the conversation module 150 can update the proposed future time based on such responses.

Further, participants can respond to such messages, calendar entries, etc. to opt in or opt out of the conversation. As noted, if a participant chooses to opt out of the conversation, the participant can be removed from a participant list of the conversation and/or the originating user can be notified that the proposed participant has opted out, for example via a message sent to the user by the conversation module 150. If a participant who has opted out is indicated as being a required participant for the conversation, the conversation module 150 can continue, in real time, processing the user inputs and attributes described herein to identify when again it is presently appropriate for the conversation to take place. If a participant who opts out of the conversation is not a required participant, the conversation can presently take place, or take place as scheduled.

In another aspect of the present arrangements, the participants (e.g., proposed participants) to the conference, such as those that are mandatory participants and/or those that are requested to participate, but not mandatory, can be dynamically adjusted based on the contextual information monitored by the conversation module. In illustration, if the contextual information indicates a particular subject matter for the conversation, the conversation module 150 can be configured to automatically add one or more participants for the conversation who were not included in the plurality of participants when the originating user requested the conversation, but who are subject matter experts on an identified subject for the conversation. For example, if the contextual information indicates that a subject of the conversation pertains to hiring a new person or terminating employment of a particular person, or pertains to a program or plan that may be affected by such, the conversation module 150 automatically can add to the plurality of participants a person who works in human resources, either as a mandatory participant or a requested participant. Similarly, if the subject matter pertains to a legal issue, or a pertains to a program or plan that may be affected by a legal issue, the conversation module 150 automatically can add to the plurality of participants a person who works in a legal department or who is an outside counsel. By way of example, as noted, at least some contextual information can be obtained from external information sources, such as news websites. Thus, if a news article references a legal issue that may affect a program or plan to be discussed in the conversation, the conversation module 150 automatically can add to the plurality of participants a person skilled in legal issues. In this regard, the conversation module 150 module can be configured to identify certain experts. For example, such experts can be maintained in a contextual information database, a personnel directory, a directory of outside experts, etc., that may be accessed by the conversation module 150.

In accordance with the foregoing, the above processes may take place in real time. Thus, the conversation module 150 can continuously process user/participant inputs and/or attributes to determine whether it is presently appropriate for the conversation to take place, and the conversation can be initiated at that time. If participant responses to such initiation indicate that one or more mandatory participants opt out, or specify conditions not presently met, the conversation module 150 can continue to process user/participant inputs and/or attributes, in real time, to determine when again it is presently appropriate for the conversation to take place, and again attempt to initiate the conversation at that time.

In some instances, after a conversation is terminated, one or more of the participants, or the originating user, may determine that another conversation is desired. Accordingly, user inputs by the originating user and/or participants can be monitored, in real time, to automatically determine whether another (e.g., follow-up) conversation is desired, and implement the processes described herein to initiate the other conversation when it is presently appropriate for the other conversation to take place. In this regard, certain participants who opt out of the initial conversation (e.g., participants who were not mandatory to the conversation), can indicate, for example when they opt out of the initial conversation, their availability for one or more later conversations. In doing so, they can specify, via user inputs, any conditions, such as those previously described. The indication of their availability for one or more future conversations, and the conditions, can be processed as contextual information by the conversation module 150 when scheduling any other conversations.

The arrangements described herein enable a conversation to take place as soon as practical, based in user/participant inputs and attributes associated with such users/participants, rather than relying on individual participants to agree on a time for the conversation to take place a priori. Accordingly, the present arrangements dramatically improve time management for those scheduling and participating in such conversations, and reduce the amount of interaction required on the part of participants for a conversation to take place.

Figure 2:
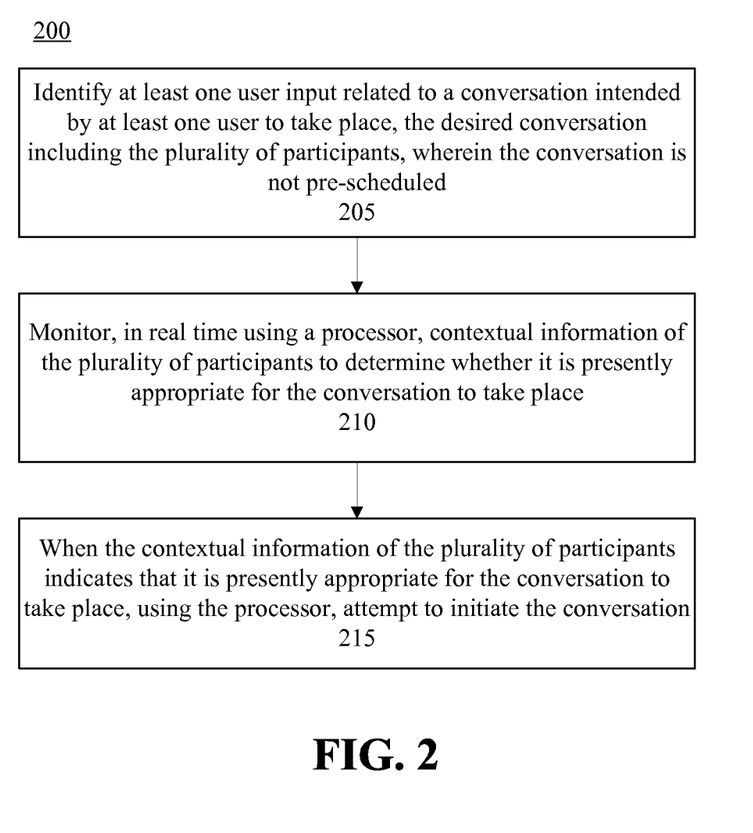
FIG. 2 is a flow chart illustrating a method of arranging a conversation among a plurality of participants in accordance with one embodiment disclosed within this specification.

FIG. 2 is a flow chart illustrating a method 200 of arranging a conversation among a plurality of participants in accordance with one embodiment disclosed within this specification.

At step 205, at least one user input related to a conversation intended by at least one user to take place can be identified. The desired conversation can include a plurality of participants. The conversation is not pre-scheduled, but instead merely requested.

At step 210, contextual information of the plurality of participants can be monitored, in real time using a processor, to determine whether it is presently appropriate for the conversation to take place. For example, for each of the plurality of participants, at least one attribute from an external information source or at least one attribute from a user input can be automatically acquired.

At step 215, when the contextual information of the plurality of participants indicates that it is presently appropriate for the conversation to take place, an attempt to initiate the conversation can be initiated using the processor, for example as described herein. In one example, attempting to initiate the conversation can include automatically placing a telephone call to each of the plurality of participants, automatically establishing a text messaging session that includes each of the plurality of participants, or automatically establishing a video conference session that includes each of the plurality of participants. In another example, attempting to initiate the conversation can include sending, to each of the participants, a message inquiring whether the respective participant is presently available to participate in the conversation. In another example, attempting to initiate the conversation can include sending a message to at least a first of the plurality of participants prompting the first participant to initiate a telephone call, log into a text messaging system, or log into a video conference server. In another example, attempting to initiate the conversation can include sending a message to a first of the plurality of participants indicating to the first participant that at least a second of the plurality of participants presently is located proximate to the first participant. In another example, attempting to initiate the conversation can include initiating presentation of an indicator on a client device associated with at least a first of the plurality of participants indicating that at least a second of the plurality of participants presently is available to participate in the conversation.

In one aspect of the present arrangements, responsive to attempting to initiate the conversation, a parameter indicating a condition necessary for a first participant to participate in the conversation can be received from at least a first of the plurality of participants. In such case, monitoring, in real time using the processor, contextual information of the plurality of participants to determine whether it is presently appropriate for the conversation to take place can include monitoring, in real time using the processor, the condition to determine whether the condition is satisfied. In one example, the parameter indicating the condition necessary for the first participant to participate in the conversation can include a time delay. In another example, the parameter indicating the condition necessary for the first participant to participate in the conversation can include an indication of at least a second participant required to participate in the conversation.

Figure 3:
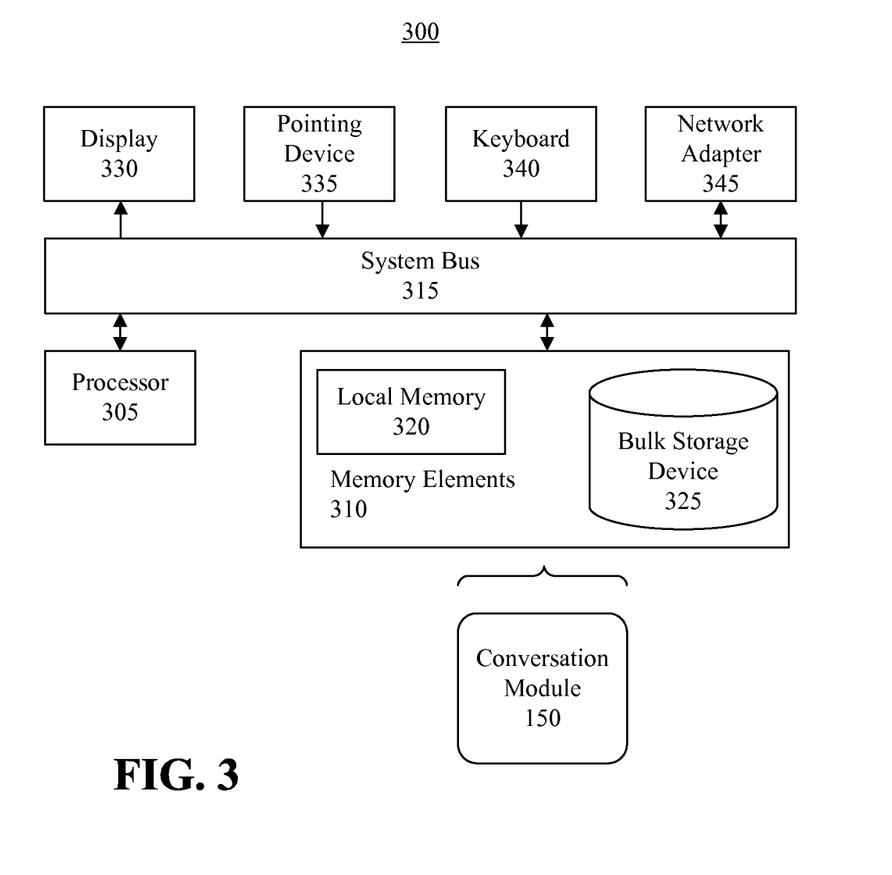
FIG. 3 is a block diagram illustrating a processing system arranging a conversation among a plurality of participants in accordance with one embodiment disclosed within this specification.

FIG. 3 is a block diagram illustrating a processing system 300 for arranging a conversation among a plurality of participants in accordance with one embodiment disclosed within this specification. The processing system 300 represents an example of a processing system that may be included as part of one or more client devices 105 and/or as part of the one or more conversation servers 110.

The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and, optionally, a keyboard 340 can be coupled to the processing system 300. The I/O devices can be coupled to the processing system 300 either directly or through intervening I/O controllers. For example, the display 330 can be coupled to the processing system 300 via a graphics processing unit (GPU), which may be a component of the processor 305 or a discrete device. One or more network adapters 345 also can be coupled to processing system 300 to enable processing system 300 to become coupled to other systems, computer systems, remote printers, and/or remote storage devices through intervening private or public networks. Modems, cable modems, and Ethernet cards are examples of different types of network adapters 345 that can be used with processing system 300.

As pictured in FIG. 3, the memory elements 310 can store certain components of the system 100 of FIG. 1, namely the conversation module 150. Being implemented in the form of executable program code, the conversation module 150 can be executed by the processing system 300 and, as such, can be considered part of the processing system 300. Moreover, the conversation module 150 is a functional data structure that imparts functionality when employed as part of the processing system 300 of FIG. 3. Moreover, the user inputs and attributes described herein are functional data structures that impart functionality when employed as part of the processing system 300 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of arranging a conversation among a plurality of participants, the method comprising:

identifying at least one originating user input related to a conversation intended by the originating user to take place, the desired conversation including a first set of the plurality of participants, wherein the conversation is not pre-scheduled;

identifying a subject of the conversation;

monitoring, using a processor, information which corresponds to the subject of the conversation, the information obtained from at least one external news website;

identifying that the information obtained from the at least one external news website includes a first contextual information that corresponds to the subject of the conversation;

identifying, using the processor, at least one additional person not currently included in the first set of the plurality of the participants for the conversation but who is an expert for the first contextual information that corresponds the subject of the conversation, and indicating that the additional person is required to participate in the conversation as a condition for the at least one participant within the first set of the plurality of participants to participate in the conversation;

monitoring, using the processor, at least a second contextual information of the at least one additional person and determining whether the at least one additional person is available to participate in the conversation;

monitoring, using a processor, at least a third contextual information of the originating user and the first set of the plurality of participants, and the second contextual information for the at least one additional person, to determine whether it is presently appropriate for the conversation to take place; and when the third contextual information of the originating user and the first set of the plurality of participants and the second contextual information for the at least one additional person indicates that it is presently appropriate for the conversation to take place, using the processor, attempting to initiate the conversation.

2. The method of claim 1, wherein monitoring, in real time using the processor, contextual information of the plurality of participants to determine whether it is presently appropriate for the conversation to take place comprises:

automatically acquiring, for each of the plurality of participants, at least one attribute from an external information source or at least one attribute from a user input.

3. The method of claim 1, wherein attempting to initiate the conversation comprises initiating at least one action selected from a group of actions consisting of automatically placing a telephone call to each of the plurality of participants, automatically establishing a text messaging session that includes each of the plurality of participants, and automatically establishing a video conference session that includes each of the plurality of participants.

4. The method of claim 1, wherein attempting to initiate the conversation comprises:

sending, to each of the participants, a message inquiring whether the respective participant is presently available to participate in the conversation.

5. The method of claim 1, wherein attempting to initiate the conversation comprises:

sending a message to at least a first of the plurality of participants prompting the first participant to initiate a telephone call, log into a text messaging system, or log into a video conference server.

6. The method of claim 1, wherein attempting to initiate the conversation comprises:

sending a message to a first of the plurality of participants indicating to the first participant that at least a second of the plurality of participants presently is located proximate to the first participant.

7. The method of claim 1, wherein attempting to initiate the conversation comprises:

initiating presentation of an indicator on a client device associated with at least a first of the plurality of participants indicating that at least a second of the plurality of participants presently is available to participate in the conversation.

8. The method of claim 1, further comprising:

responsive to attempting to initiate the conversation, receiving from at least a first of the plurality of participants a parameter indicating a condition necessary for the first participant to participate in the conversation;

wherein monitoring, using the processor, the third contextual information of the originating user and the first set of the plurality of participants, and the second contextual information for the at least one additional person, to determine whether it is presently appropriate for the conversation to take place comprises:

monitoring, using the processor, the condition to determine whether the condition is satisfied.

9. The method of claim 8, wherein the parameter indicating the condition necessary for the first participant to participate in the conversation comprises a time delay or an indication of at least a second participant required to participate in the conversation.

10. The method of claim 1, further comprising:

based on the contextual information, dynamically including at least one additional participant for the conversation who was not included in the plurality of participants when the at least one user input is identified.

11. A system comprising:

a processor programmed to initiate executable operations comprising:

identifying at least one originating user input related to a conversation intended by the originating user to take place, the desired conversation including a first set of the plurality of participants, wherein the conversation is not pre-scheduled;

identifying a subject of the conversation;

monitoring, using a processor, information which corresponds to the subject of the conversation, the information obtained from at least one external news website;

identifying that the information obtained from the at least one external news website includes a first contextual information that corresponds to the subject of the conversation;

identifying, using the processor, at least one additional person not currently included in the first set of the plurality of the participants for the conversation but who is an expert for the first contextual information that corresponds the subject of the conversation, and indicating that the additional person is required to participate in the conversation as a condition for the at least one participant within the first set of the plurality of participants to participate in the conversation;

monitoring, using the processor, at least a second contextual information of the at least one additional person and determining whether the at least one additional person is available to participate in the conversation;

monitoring, using a processor, at least a third contextual information of the originating user and the first set of the plurality of participants, and the second contextual information for the at least one additional person, to determine whether it is presently appropriate for the conversation to take place; and when the third contextual information of the originating user and the first set of the plurality of participants and the second contextual information for the at least one additional person indicates that it is presently appropriate for the conversation to take place, using the processor, attempting to initiate the conversation.

12. The system of claim 11, wherein monitoring, in real time, contextual information of the plurality of participants to determine whether it is presently appropriate for the conversation to take place comprises:

automatically acquiring, for each of the plurality of participants, at least one attribute from an external information source or at least one attribute from a user input.

13. The system of claim 11, wherein attempting to initiate the conversation comprises initiating at least one action selected from a group of actions consisting of automatically placing a telephone call to each of the plurality of participants, automatically establishing a text messaging session that includes each of the plurality of participants, and automatically establishing a video conference session that includes each of the plurality of participants.

14. The system of claim 11, wherein attempting to initiate the conversation comprises:

sending, to each of the participants, a message inquiring whether the respective participant is presently available to participate in the conversation.

15. The system of claim 11, wherein attempting to initiate the conversation comprises:

sending a message to at least a first of the plurality of participants prompting the first participant to initiate a telephone call, log into a text messaging system, or log into a video conference server.

16. The system of claim 11, wherein attempting to initiate the conversation comprises:

sending a message to a first of the plurality of participants indicating to the first participant that at least a second of the plurality of participants presently is located proximate to the first participant.

17. The system of claim 11, wherein attempting to initiate the conversation comprises:

initiating presentation of an indicator on a client device associated with at least a first of the plurality of participants indicating that at least a second of the plurality of participants presently is available to participate in the conversation.

18. The system of claim 11, wherein the processor further is programmed to initiate executable operations comprising:

responsive to attempting to initiate the conversation, receiving from at least a first of the plurality of participants a parameter indicating a condition necessary for the first participant to participate in the conversation;

wherein monitoring, using the processor, the third contextual information of the originating user and the first set of the plurality of participants, and the second contextual information for the at least one additional person, to determine whether it is presently appropriate for the conversation to take place comprises:

monitoring, using the processor, the condition to determine whether the condition is satisfied.

19. The system of claim 18, wherein the parameter indicating the condition necessary for the first participant to participate in the conversation comprises a time delay or an indication of at least a second participant required to participate in the conversation.

20. A computer program product for arranging a conversation among a plurality of participants, the computer program product comprising a non-transitory computer readable storage medium having program code stored thereon, the program code executable by a processor to perform a method comprising:

identifying at least one originating user input related to a conversation intended by the originating user to take place, the desired conversation including a first set of the plurality of participants, wherein the conversation is not pre-scheduled;

identifying a subject of the conversation;

monitoring, using a processor, information which corresponds to the subject of the conversation, the information obtained from at least one external news website;

identifying that the information obtained from the at least one external news website includes a first contextual information that corresponds to the subject of the conversation;

identifying, using the processor, at least one additional person not currently included in the first set of the plurality of the participants for the conversation but who is an expert for the first contextual information that corresponds the subject of the conversation, and indicating that the additional person is required to participate in the conversation as a condition for the at least one participant within the first set of the plurality of participants to participate in the conversation;

monitoring, using the processor, at least a second contextual information of the at least one additional person and determining whether the at least one additional person is available to participate in the conversation;

monitoring, using a processor, at least a third contextual information of the originating user and the first set of the plurality of participants, and the second contextual information for the at least one additional person, to determine whether it is presently appropriate for the conversation to take place; and when the third contextual information of the originating user and the first set of the plurality of participants and the second contextual information for the at least one additional person indicates that it is presently appropriate for the conversation to take place, using the processor, attempting to initiate the conversation.

* * * * *